United States Patent Office 3,515,723
Patented June 2, 1970

3,515,723
2 - (5 - AMINO - 1H - 1,2,4 - TRIAZOL - 3 - YL)-3-AMINOPYRAZINES AND PROCESSES FOR THEIR PREPARATION
Edward J. Cragoe, Jr., Lansdale, Pa., assignor to Merck & Co., Inc., Rahway, N.J., a corporation of New Jersey
No Drawing. Filed Nov. 14, 1967, Ser. No. 682,978
Int. Cl. C07d 51/76
U.S. Cl. 260—250          16 Claims

ABSTRACT OF THE DISCLOSURE 3-aminopyrazinamidoguanidines are cyclized by heating to 2-(5-amino-1H-1,2,4-triazol-3-yl)-3-aminopyrazines. The products are effective diuretic agents.

---

This invention relates to novel 2-(5-amino-1H-1,2,4-triazol-3-yl)-3-aminopyrazines and novel processes for their preparation. The novel compounds of this invention are represented by the structural formula

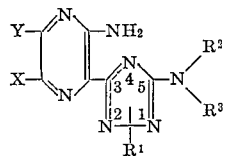

and pharmaceutically acceptable salts thereof wherein $R^1$ is attached to the nitrogen at position 2 or 4, of the triazole ring, and wherein $R^1$ represents
 (a) hydrogen,
 (b) lower alkyl of from 1 to about 5 carbon atoms, either straight or branched chain, e.g., methyl, ethyl, propyl, isopropyl, butyl, sec-butyl, pentyl, isopentyl or the like, and
 (c) phenyl-lower alkyl, e.g., benzyl, phenethyl or the like;

$R^2$ represents
 (a) hydrogen
 (b) lower alkenyl of from 3 to about 5 carbon atoms such as allyl, 1-propenyl and the like,
 (c) lower alkyl of from 1 to about 5 carbon atoms, either straight or branched chain, e.g., methyl, ethyl, propyl, isopropyl, butyl, sec-butyl, pentyl, isopentyl or the like, and either unsubstituted or substituted with such as
  (1) hydroxy, and
  (2) mononuclear aryl, especially phenyl,
 (d) amino,
 (e) mononuclear aryl, especially phenyl;

$R^3$ represents
 (a) hydrogen,
 (b) lower alkyl of from 1 to about 5 carbons, either straight or branched chain, e.g., methyl, ethyl, propyl, isopropyl, butyl, iso-butyl, t-butyl, pentyl, neopentyl or the like, and
 (c) lower alkenyl of from 3 to about 5 carbon atoms such as allyl, 1-propenyl and the like;

X represents
 (a) hydrogen, or
 (b) halogen such as chloro, bromo, and iodo;

Y represents
 (a) hydrogen,
 (b) trifluoromethyl, or
 (c) amino of structure

wherein $R^4$ represents
 (1) hydrogen,
 (2) lower alkyl either branched or straight chain of from 1 to about 5 carbons, e.g., methyl, ethyl, n-propyl, isopropyl, n-butyl, sec-butyl, pentyl, isopentyl or the like, and $R^5$ represents
 (1) hydrogen,
 (2) lower alkoxy,
 (3) lower cycloalkyl, having from 3 to 6 nuclear carbons,
 (4) lower alkenyl, of from 3 to about 5 carbons, e.g., allyl, 1-propenyl or the like,
 (5) lower alkyl, either straight or branched chain of from 1 to about 5 carbons, e.g., methyl, ethyl, n-propyl, isopropyl, n-butyl, sec-butyl, pentyl, isopentyl or the like and either unsubstituted or substituted, such as with
  (a) hydroxy,
  (b) lower cycloalkyl of 3 to about 6 carbons, such as cyclopropyl, cyclopentyl, and cyclohexyl,
  (c) mononuclear aryl, especially phenyl either unsubstituted or substituted with such as lower alkyl, of from 1 to about 5 carbons, halo, e.g., chloro, bromo, or fluoro,
  (d) a heterocyclic group, especially furyl, pyridyl or the like, and
  (e) amino, either unsubstituted or mono- or di(lower alkyl)amino;

and when $R^4$ and $R^5$ each represents lower alkyl, they can be linked together to form a cyclic structure with the nitrogen atom to which they are attached, particularly a 5- to 8-membered ring, advantageously forming with the nitrogen atom a 1-pyrrolidinyl, piperidino, hexahydro-1-azepinyl, or octahydro-1-azocinyl radical or the like.

The novel compounds of this invention are useful as diuretic and saluretic agents in the treatment of disorders manifesting an abnormal degree of water retention.

The products of this invention can be administered in the form of pills, tablets, capsules, elixirs, injectable preparations and the like and can comprise one or more of the compounds of this invention as the only essential active ingredient of the pharmaceutical formulation, or, the novel compound(s) can be combined in pharmaceutical formulations with other therapeutic agents. The compounds of this invention are advantageously administered at a dosage range of from about 5 mg./day to about 750 mg./day or at a somewhat higher or lower dosage preferably in subdivided amounts on a 2 to 4 times a day regimen.

In some instances, for pharmaceutical reasons, it may be desirable to make a salt of these novel compounds, using a pharmaceutically acceptable acid, and these salts are to be considered as included in this invention and within the scope of the claims.

The novel compounds of this invention are prepared by cyclization of pyrazinamidoguanidines according to Equation A or B depending on the location of the $R^1$ substituent.

Equation A

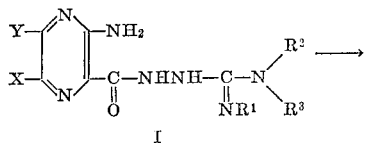

I

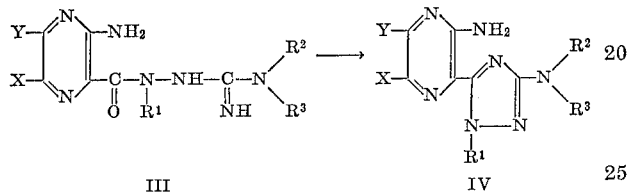

II

Equation B

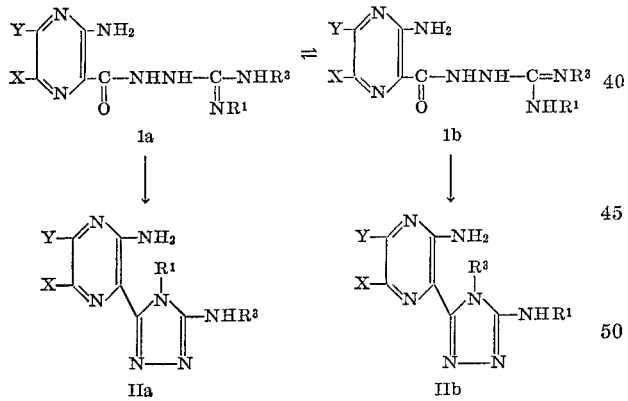

III        IV

The cyclization occurs on heating compounds such as I or III at a temperature from about 50° C. to about 300° C. with or without a solvent. The nature of the solvent if one is employed is not critical but the solvent of choice is a polar hydrophilic solvent such as dimethyl sulfoxide, sulfolane, pyridine hydrochloride and the like or alcohols such as ethanol, isopropyl alcohol or n-butyl alcohol.

In the example illustrated by Equation A, a possibility of isomeric products exists when $R^2$ (or $R^3$) is hydrogen, in as much as the starting material is tautomeric, that is:

Ia ⇌ Ib

↓       ↓

IIa      IIb

Whether IIa or IIb or a mixture is produced is dependent upon the nature of the substituents, $R^1$, $R^2$ and $R^3$. The actual structure of the products can be assigned from the physical, chemical and spectroscopic properties.

The ease of cyclization of I or III depends upon the nature of the substituents $R^1$, $R^2$, $R^3$, X and Y. In fact, the energetics of the ring closure are such that if conditions are not carefully controlled, reactions designed to produce I, Ia, Ib or III can yield mainly cyclized products II, IIa, IIb or IV. These results are most frequently observed where the cyclization is facile and/or where vigorous reaction conditions are required for the preparation of I, Ia, Ib or III. Therefore it is often convenient to design the synthesis of the novel cyclic products of this invention (II, IIa, IIb or IV) starting with the precursors of I, Ia, Ib or III and conduct the condensation, by one of the four methods described below, under conditions such that the intermediate pyrazinamidoguanidines are cyclized in situ, thus obviating the necessity of isolating them and cyclizing in a separate step. However, in each case the intermediate pyrazinamidoguanidine is an isolatable intermediate and the isolation can be accomplished simply by adjustment of reaction conditions, such as by prolonging the reaction time and increasing the reaction temperature. The novel process of this invention is the cyclization of the intermediate pyrazinamidoguanidine.

The four methods for preparing the intermediate pyrazinamidoguanidines are illustrated for the formation of I, but it is to be understood that the same processes can be used for formation of the pyrazinamidoguanidines of Formula Ia, Ib or III.

(A) Reaction of an ester with an aminoguanidine (1) Simple esters

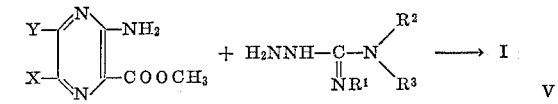

V (2) More reactive esters

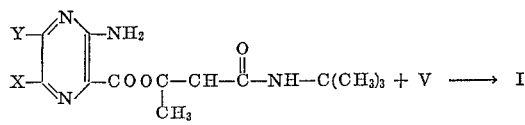

This type of ester is prepared by the reaction of the corresponding pyrazinoic acid with a substituted isoxazolium salt.

(B) Reaction of a hydrazide with an S-substituted isothiourea

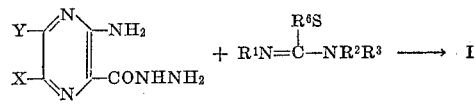

wherein $R_7$ represents lower alkyl or aralkyl.

(C) Reaction of hydrazide with a cyanamide

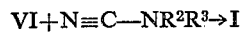

(D) Reaction of a 2-alkyl-4H-pyrazin[2,3-d][1,3]oxazin-4-one with an aminoguanidine, followed by hydrolysis of the intermediate acylamino compound

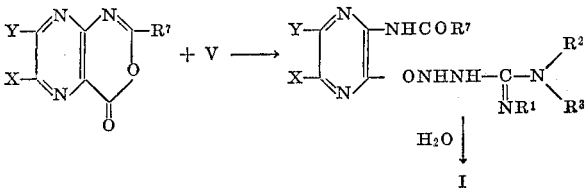

wherein $R_7$ represents lower alkyl or aralkyl.

The acid salts of the novel compounds of this invention can be prepared by any suitable known method. Particularly useful salts are the hydrohalide salts, such as hydrochloride, hydrobromide, and hydroiodide, the sulfate, phosphate and other inorganic acid salts, as well as organic acid salts such as the acetate, maleate, tartrate and the like salts.

The following examples are illustrative of the methods by which the products of this invention can be prepared. Although most of the products can be made from intermediates prepared by any or all of the above described methods, to avoid an undesirable multiplicity of examples the preparation of each product has been described from intermediates prepared by one or perhaps two of the available methods. Thus, the examples are not to be considered as limiting the invention to the particular procedural conditions employed or to the particular compounds prepared thereby.

EXAMPLE 1

2-(4-methyl-5-methylamino-1H-1,2,4-triazol-3-yl)-3-amino-6-chloropyrazine

Sodium (2.25 g., 0.098 mole) is dissolved in ethanol (50 ml.), and this solution is added to N,N'S-trimethylisothiuronium iodide (25.0 g., 0.1 mole) in dimethyl sulfoxide (100 ml.). This solution is mixed with a solution of 3-amino-6-chloropyrazinoic acid hydrazide (10 g., 0.055 mole) in dimethyl sulfoxide (150 ml.) and the reaction mixture is heated on the steam bath under vacuum (approximately 100 mm.) for 48 hours. The dimethyl sulfoxide is removed by distillation under reduced pressure and the residue is dissolved in dilute hydrochloric acid (200 ml.). The solid which separates on cooling is collected on a filter and recrystallized from an isopropyl alcohol-water mixtue to give 6.5 g. (43%) of 2-(4-methyl - 5 - methylamino-1H-1,2,4-triazol-3-yl)-3-amino-6-chloropyrazine, M.P. 317–318° C. with decomposition.

Analysis.—Calc'd for $C_8H_{10}ClN_7$ (+HCl)$_7$ (percent): C, 34.79; H, 4.02; N, 35.51. Found (percent): C, 34.40; H, 3.88; N, 35.52.

EXAMPLE 2

2-(4-methyl-5-dimethylamino-1H-1,2,4-triazol-3-yl)-3-amino-6-chloropyrazine

Sodium (2.3 g., 0.10 mole) is dissolved in absolute methanol (50 ml.) and the meethanol is removed under reduced pressure. S-benzyl-N,N,N'-trimethylisothiuronium chloride (24.5 g., 0.10 mole) dissolved in dimethyl sulfoxide (100 ml.) is added to the sodium methoxide and this mixture is warmed on the steam bath. 3-amino-6-chloropyrazinoic acid hydrazide (9.4 g., 0.05 mole) is added and the reaction mixture is heated on the steam bath under partial vacuum (approximately 100 mm.) for 24 hours. The dimethyl sulfoxide is removed by distillation under reduced pressure and the residue is dissolved in dilute hydrochloric acid. This solution is rendered alkaline by the addition of dilute sodium hydroxide solution. The solid which separates is removed by filtration and dried, yielding 2.4 g. (18%) of 2-(4-methyl-5-dimethylamino - 1H-1,2,4-triazol-3-yl)-3-amino-6-chloropyrazine, M.P. 178–180° C.

Analysis.—Calc'd for $C_9H_{12}ClN_7$ (percent): C, 42.61; H, 4.77; N, 33.65. Found (percent): C, 42.76; H, 5.02; N, 38.61.

EXAMPLE 3

2-(5-amino-1H-1,2,4-triazol-3-yl)-3-amino-5-trifluoromethylpyrazine

Sodium (2.88 g., 0.125 mole) is dissolved in absolute methanol (150 ml.). Aminoguanidine hydrochloride (15.22 g., 0.137 mole) is added and the mixture stirred for one hour at room temperature. The precipitate of sodium chloride is filtered off and the filtrate is evaporated to a thick paste under reduced pressure. Methyl 3-amino-5-trifluoromethylpyrazinoate (5.25 g., 0.025 mole) is added, the mixture is stirred for five minutes under nitrogen and then is heated on the steam bath for two minutes. The resulting mixture is diluted with water (50 ml.) and filtered. The filtrate is neutralized with acetic acid and the solid which separates is collected on a filter and dried; the yield is 970 mg. Recrystallization from isopropyl alcohol gives 2-(5-amino-1H-1,2,4-triazol-3-yl)-3-amino-5-trifluoromethylpyrazine, M.P. 316–318° C. with decomposition.

Analysis.—Calc'd for $C_7H_6F_3N_7$ (percent): C, 34.29; H, 2.47; N, 40.00. Found (percent): C, 34.25; H, 2.85; N, 40.35.

EXAMPLE 4

2-(5-methylamino-1H-1,2,4-triazol-3-yl)-3,5-diamino-6-chloropyrazine

Sodium (0.92 g., 0.04 mole) is dissolved in dry absolute ethanol (30 ml.) and this solution is added dropwise to a stirred refluxing mixture of methyl 3,5-diamino-6-chloropyrazinoate (4.04 g., 0.02 mole) and 3-methyl-1-aminoguanidine hydroiodide (8.6 g., 0.04 mole) in dry absolute ethanol (70 ml.) under nitrogen. Refluxing is continued for 24 hours and the solid which separates is collected and dissolved in water (100 ml.). A small amount of insoluble material is removed by filtration and the filtrate is acidified with dilute hydrochloric acid. The precipitate is removed by filtration and dried; the yield is 930 mg. (18%) M.P. 261–265° C. with decomposition. Recrystallization from a mixture of 80% acetonitrile and 20% water gives 2-(5-methylamino-1H-1,2,4-triazol-3-yl)-3,5-diamino-6-chloropyrazine, M.P. 274–276° C. with decomposition.

Analysis.—Calc'd for $C_7H_9ClN_8$ (percent): C, 34.93; H, 3.77; N, 46.57. Found (percent): C, 35.28; H, 3.84; N, 47.30.

EXAMPLE 5

2-(5-anilino-1H-1,2,4-triazol-3-yl)-3,5-diamino-6-chloropyrazine

Sodium (1.4 g., 0.061 mole) is dissolved in dry absolute ethanol (30 ml.) and this solution is added dropwise to a stirred refluxing mixture of methyl 3,5-diamino-6-chloropyrazinoate (6.3 g., 0.031 mole) and 3-phenyl-1-aminoguanidine hydroiodide (17.22 g., 0.062 mole) in dry absolute ethanol (70 ml.) under an atmosphere of dry nitrogen. Refluxing is continued for 24 hours and the solid which separates is removed by filtration. The filtrate is diluted with water (200 ml.) and the solid which precipitates on cooling is separated by filtration and dried. The yield is 1.6 g. (17%), M.P. 261–264° C. with decomposition. Recrystallization from 50% aqueous ethanol gives 2 - (5 - anilino - 1H - 1,2,4 - triazol - 3 - yl) - 3,5-diamino-6-chloropyrazine, M.P. 319–320° C. with decomposition.

Analysis.—Calc'd for $C_{12}H_{11}ClN_8$ (percent): C, 47.60; H, 3.66; N, 37.02. Found (percent): C, 47.59; H, 3.64; N, 37.23.

EXAMPLE 6

2-(5-diallylamino-1H-1,2,4-triazol-3-yl)-3,5-diamino-6-chloropyrazine

A mixture of 3,5-diamino-6-chloropyrazinoic acid hydrazide (2.0 g., 0.01 mole), diallylcyanamide (2.44 g., 0.02 mole) and pyridine hydrochloride (1.16 g., 0.01 mole) is heated to 175° C. for approximately one-half hour. Water (50 ml.) is added to the cooled residue and the solid is removed by filtration and dried. The yield is 700 mg. (23%), M.P. 271–279° C. with decomposition. Recrystallization from a mixture of 90% acetonitrile and 10% water gives 2-(5-diallylamino-1H-1,2,4-triazol-3-yl)-3,5-diamino-6-chloropyrazine, M.P. 286–288° C. with decomposition.

Analysis.—Calc'd for $C_{12}H_{15}ClN_8$ (percent): C, 46.98; H, 4.93; N, 36.53. Found (percent): C, 47.30; H, 4.86; N, 36.84.

EXAMPLE 7

2-(5-amino-1H-1,2,4-triazol-3-yl)-3,5-diamino-6-chloropyrazine

A mixture of methyl 3,5-diamino-6-chloropyrazinoate (10.0 g., 0.05 mole) and aminoguanidine hydrochloride (6.8 g., 0.062 mole) in n-butyl alcohol (300 ml.) is refluxed. A solution of sodium (1.4 g., 0.061 mole) in methanol (100 ml.) is added dropwise and refluxing is continued for 60 hours. The mixture is cooled and the precipitated solid is separated by filtration and dried. The yield is 2.62 g. (23%), M.P. 292–293° C. with decomposition. Recrystallization from a mixture of 50% acetonitrile in water gives 2-(5-amino-1H-1,2,4-triazol-3-yl)-3,5-diamino-6-chloropyrazine, M.P. 295–297° C. with decomposition.

Analysis.—Calc'd for $C_6H_7ClN_8$ (percent): C, 31.73; H, 3.11; N, 49.45. Found (percent): C, 32.17; H, 3.20; N, 49.35.

EXAMPLE 8

2-(2-methyl-5-amino-1H-1,2,4-triazol-3-yl)-3,5-diamino-6-chloropyrazine

Step A.—Preparation of 3,5-diamino-6-chloropyrazinoic acid 1-methylhydrazide: Methyl 3,5-diamino-6-chloropyrazinoate (30 g., 0.15 mole) is suspended in 2-methoxyethanol (150 ml.) and warmed on the steam bath. Methylhydrazine (60 ml.) is added and the resulting solution is heated with stirring for 24 hours. The reaction mixture is diluted with water and allowed to stand. The yellow solid which separates is collected on a filter and dried. The yield is 19.3 g., M.P. 173–177° C. (60%). Recrystallization from chloroform gives 3,5-diamino-6-chloropyrazinoic acid 1-methylhydrazide, M.P. 176–177.5° C.

*Analysis.*—Calc'd for $C_6H_9ClN_6O$ (percent): C, 33.26; H, 4.19; N, 38.80. Found (percent): C, 33.35; H, 4.04; N, 38.75.

Step B.—Preparation of 2-(2-methyl-5-amino-1H-1,2,4-triazol-3-yl)-3,5-diamino-6-chloropyrazine: A mixture of 3,5-diamino-6-chloropyrazinoic acid 1 - methylhydrazide (5.4 g., 0.025 mole), cyanamide (5.0 g., 0.12 mole), and pyridine hydrochloride is heated to 125–130° C. for one-half hour. Ethanol (50 ml.) is added to the cooled residue and the solid is separated by filtration and dissolved in water (75 ml.). This solution is made alkaline by the addition of 20% sodium hydroxide solution (15 ml.). The solid which separates upon standing is removed by filtration and dried. The yield is 4.9 g. (82%), M.P. 270–274° C. with decomposition. Recrystallization from a mixture of 70% acetonitrile and 30% water gives 2-(2-methyl-5-amino - 1H - 1,2,4 - triazol - 3 - yl)-3,5-diamino-6-chloropyrazine, M.P. 281–283° C. with decomposition.

*Analysis.*—Calc'd for $C_7H_9ClN_8$ (percent): C, 34.93; H, 3.77; N, 46.57. Found (percent): C, 34.54; H, 3.87; N, 46.85.

Employing the procedure of Example 8, but substituting for the methylhydrazine of Step A, an equivalent amount of propylhydrazine there is produced in sequence:

Step A: 3,5-diamino - 6 - chloropyrazinoic acid 1-propylhydrazide

Step B: 2-(2-propyl-5-amino-1H-1,2,4-triazol-3-yl) - 3,5-diamino-6-chloropyrazine.

EXAMPLE 9

2-(2-phenethyl-5-amino-1H,1,2,4-triazol-3-yl)-3,5-diamino-6-chloropyrazine

Step A.—Preparation of (phenethylideneamino)guanidine: To a solution of phenylacetaldehyde (96.12 g., 0.4 mole) (50% in alcohol) in ethanol (200 ml.) is added a solution prepared by suspending aminoguanidine bicarbonate (81.67 g., 0.06 mole) in water (200 ml.) and adding concentrated hydrochloric acid (50 ml., 0.6 mole). The resulting cloudy mixture is heated on a steam bath for 10 minutes to effect a clear solution.

The cooled reaction solution is diluted with water (600 ml.) and then 40% sodium hydroxide solution is added in excess which causes the product to separate from the solution in the form of an oil. After chilling in ice, the oil crystallizes as an orange-tan solid. The yield is 68.9 g. (98%), M.P. 126–128° C. Recrystallization from ethyl acetate gives 42.3 g. (60%) of cream colored, glistening platelets of (phenethylideneamino)guanidine, M.P. 137–139° C. A sample of the free base is converted to the hydrochloride salt, a white, crystalline solid, M.P. 130–131° C.

*Analysis.*—Calc'd for $C_9H_{12}N_4(+HCl)$ (percent): C, 50.82; H, 6.16; N, 26.34. Found (percent): C, 50.92; H, 6.06; N, 26.54.

Step B.—Preparation of (Phenethylamino)guanidine hydrochloride: To a solution of (phenethylideneamino) guanidine (21.15 g., 0.12 mole) in absolute ethanol (200 ml.) is added concentrated hydrochloric acid (12 ml., 0.144 mole). Then the catalyst 5% platinum on carbon (5 g.) is added and the mixture is hydrogenated at ambient temperature and an initial hydrogen pressure of 45 p.s.i. using a standard Paar apparatus. After 8 hours the theoretical amount of hydrogen is absorbed.

The catalyst is removed by filtration and the colorless filtrate is evaporated under reduced pressure to give a theoretical amount of white solid. Recrystallization from isopropyl alcohol gives 18.01 g. (70%) of phenethylaminoguanidine hydrochloride in the form of white prisms, M.P. 156–157° C.

*Analysis.*—Calc'd for $C_9H_{14}N_4(+HCl)$ (percent): C, 50.35; H, 7.04; Cl, 16.51. Found (percent): C, 50.48; H, 6.71; Cl, 16.36.

Step C.—Preparation of 2-(2-phenethyl-5-amino-1H-1, 2,4 - triazol - 3 - yl)-3,5-diamino-6-chloropyrazine: To a solution of sodium (1.38 g., 0.06 mole) in methanol (40 ml.) is added (phenethylamino)guanidine hydrochloride (14.17 g., 0.066 mole). After stirring for 30 minutes at room temperature, the mixture is filtered and the filtrate is concentrated to a paste under reduced pressure. The residue is dissolved in isopropyl alcohol (10 ml.) and treated with methyl 3,5-diamino - 6 - chloropyrazinoate (4.06 g., 0.02 mole). The mixture is heated on a steam bath for 2 hours with stirring. The cooled reaction mixture is diluted with water (50 ml.) and the resulting yellow solid is collected by filtration, washed with water and dried. The yield is 5.23 g. (80%), M.P. 200–205° C. Recrystallization from ethanol gives 3.92 g. (60%) of 2-(2-phenethyl-5-amino-1H-1,2,4-triazol-3-yl)-3,5 - diamino-6-chloropyrazine in the form of light yellow needles, M.P. 211.5–212.5° C.

*Analysis.*—Calc'd for $C_{14}H_{15}ClN_8$ (percent): C, 50.83; H, 4.57; Cl, 10.72; N, 33.88. Found (percent): C, 50.88; H, 4.46; Cl, 11.01; N, 34.17.

EXAMPLE 10

2-(5-amino-1H-1,2,4-triazol-3-yl)-3-amino-6-chloropyrazine 3-amino-6-chloropyrazinamidoguanidine (4.0 g., 0.0175 mole) is heated under nitrogen to 280–290° C. for one-half hour. The cooled residue is dissolved in dilute hydrochloric acid, treated with charcoal, and filtered. The filtrate is made strongly alkaline by the addition of sodium hydroxide solution. A small amount of insoluble material is filtered off and the filtrate neutralized by the addition of dilute hydrochlorid acid. The solid which separates on cooling is collected on a filter and dried. The yield of 2-(5-amino-1H, 1,2,4-triazol-3-yl)-3-amino - 6 - chloropyrazine is 1.7 g. (46%), M.P. 333–334° C. with decomposition.

*Analysis.*—Calc'd for $C_6H_6ClN_7$ (percent): C, 34.05; H, 2.86; N, 46.34. Found (percent): C, 33.22; H, 2.82, N, 46.06.

EXAMPLE 11

2-(5-amino-1H,1,2,4-triazol-3-yl)-3-amino-6-chloropyrazine

A solution of 3-amino-6-chloropyrazinamidoguanidine (4.0 g., 0.175 mole) in 600 ml. of n-butyl alcohol is treated with a catalytic amount of sodium methoxide and refluxed for 25 hours. The mixture is cooled and the precipitated solid is collected on a filter, dried, and recrystallized from an acetonitrile-water mixture to give 2-(5-amino-1H-1,2,4-triazol-3-yl)-3-amino - 6 - chloropyrazine, M.P. 333–334° C. (dec.).

EXAMPLE 12

2-(5-t-butylamino-1H-1,2,4-triazol-3-yl)-3,5-diamino-6-chloropyrazine

Step A.—Preparation of 1-(3,5-diamino - 6 - chloropyrazinamido)-3-t-butylguanidine: A mixture of 3,5-diamino-6-chloropyrazinoic acid hydrazide (5.0 g., 0.025 mole), t-butylcyanamide (7.5 ml.), and pyridine hydrochloride (10 g.) is heated at 125–130° C. for two hours. Water (100 ml.) is added, followed by the addition of 20% sodium hydroxide solution (25 ml.). The solid which slowly separates is collected on a filter and dried. The yield is 6.32 g., (84%), M.P. 160° C., resolidifies and then melts at 275° C. (dec.). Recrystallization from acetonitrile gives yellow crystals of 1-(3,5-diamino-6-chloropyrazinamide)-3-t-butylguanidine, M.P. unchanged.

*Analysis.*—Calc'd for $C_{10}H_{17}ClN_8O$ (percent): C, 39.93; H, 5.70; N, 37.26. Found (percent): C, 40.10; H, 5.65; N, 37.17.

Step B.—Preparation of 2-(5-t-butylamino-1H-1,2,4-triazol-3-yl)-3,5-diamino-6-chloropyrazine: A solution of 1-(3,5-diamino - 6 - chloropyrazinamido) - 3 - t - butylguanidine (4.0 g.) in dimethyl sulfoxide (75 ml.) is heated on the steam bath for 24 hours. The dimethyl sulfoxide is evaporated under reduced pressure and the residue is dissolved in dilute hydrochloric acid. This solution is rendered alkaline by the addition of dilute sodium hydroxide solution. The solid which separates is removed by filtration and dried to give 2-(5-t-butylamino-1H-1,2,4-triazol-3-yl)-3,5-diamino-6-chloropyrazine.

EXAMPLE 13

2-(5-di-n-butylamino-1H-1,2,4-triazol-3-yl)-3,5-diamino-6-chloropyrazine

Step A.—Preparation of 1-(3,5-diamino - 6 - chloropyrazinamido)-3,3-di-n-butylguanidine: A mixture of 3,5-diamino-6-chloropyrazinoic acid hydrazide (1.0 g., 0.004 mole), di-n-butylcyanamide (1.0 ml.) and pyridine hydrochloride (2.0 g.) is heated at 125° C. for one hour. Water 10 ml. is added to the cooled reaction mixture and the solution is made basic by the addition of aqueous sodium hydroxide. The solid that separates is collected, dried and recrystallized from acetonitrile-water to give pure 1-(3,5-diamino - 6 - chloropyrazinamido) - 3,3 - di - n - butylguanidine.

Step B.—Preparation of 2-(5-di-n-butylamino-1H-1,2,4-triazol-3-yl)-3,5-diamino-6-chloropyrazine: A solution of 1-(3,5-diamino - 6 - chloropyrazinamido) - 3,3 - di - n - butylguanidine (4.0 g.) in dimethyl sulfoxide (75 ml.) is heated on a steam bath for 24 hours. The dimethyl sulfoxide is evaporated under reduced pressure and the residue is dissolved in dilute hydrochloric acid. This solution is rendered alkaline by the addition of dilute sodium hydroxide solution. The solid which separates is removed by filtration and dried to give 2-(5-di-n-butylamino-1H-1,2,4-triazol-3-yl)-3,5-diamino-6-chloropyrazine.

Employing the procedures described in either of Examples 10, 11 or 12B, but substituting for the 3-amino-6-chloropyrazinamidoguanidine utilized in Examples 10 and 11, and the 1-(3,5-diamino-6-chloropyrazinamido)-3-t-butylguanidine used in Example 12B, similar quantities of 1-(3-amino-5-Y-6-X-pyrazinamido) - 3 - $R^2$ - 3 - $R^3$-guanidine described in Table I, there are produced the corresponding 2-(5-$NR^2R^3$-1H-1,2,4-triazol - 3 - yl) - 3-amino-5-Y-6-X-pyrazines also described in Table I.

TABLE I

| Example | Y | X | $R^2$ | $R^3$ |
|---|---|---|---|---|
| 14 | H | Br | H | H |
| 15 | H | I | H | H |
| 16 | H | Cl | $CH_3-$ | H |
| 17 | H | Cl | $HO(CH_2)_2-$ | H |
| 18 | H | Cl | $CH_3-$ | $CH_3-$ |
| 19 | H | Cl | 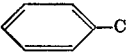 | H |
| 20 | H | Cl | $NH_2-$ | H |
| 21 | $CF_3-$ | H | H | H |
| 22 | H | Cl | 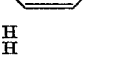$-CH_2CH_2-$ | H |
| 23 | H | Cl | $-CH_2-$ | H |
| 24 | H | H | H | H |
| 25 | $NH_2-$ | Cl | H | H |
| 26 | $(CH_3)_2N-$ | Cl | H | H |
| 27 | $CH_2=CH-CH_2NH-$ | Cl | H | H |
| 28 | $i\text{-}C_3H_7NH-$ | Cl | H | H |
| 29 | $NH_2-$ | Br | H | H |
| 30 | $NH_2-$ | I | H | H |
| 31 | $CH_3(CH_2)_4NH-$ | Cl | H | H |
| 32 | $-CH_2NH-$ | Cl | H | H |
| 33 | $-NH-$ | Cl | H | H |
| 34 | $-NH-$ | Cl | H | H |
| 35 | $-CH_2NH-$ | Cl | H | H |
| 36 | $CH_3-$$-CH_2NH-$ | Cl | H | H |
| 37 | $Cl-$$-CH_2NH-$ | Cl | H | H |
| 38 | $HO(CH_2)_2NH-$ | C | H | H |
| 39 | $H_2N(CH_2)_2NH-$ | Cl | H | H |
| 40 | $(CH_3)_2N(CH_2)_2NH-$ | Cl | H | H |

TABLE I—Continued

| Example | Y | X | R² | R³ |
|---|---|---|---|---|
| 41 | 4-(N-pyridyl)-CH₂NH— | Cl | H | H |
| 42 | 2-furyl-CH₂NH— | Cl | H | H |
| 43 | (C₂H₅)(CH₃)N— | Cl | H | H |
| 44 | (CH₂=CH—CH₂)(C₂H₅)N— | Cl | H | H |
| 45 | (CH₃O)(CH₃)N— | Cl | H | H |
| 46 | pyrrolidin-1-yl | Cl | H | H |
| 47 | piperidin-1-yl | Cl | H | H |
| 48 | 4-methylpiperazin-1-yl | Cl | H | H |

EXAMPLE 49

Dry filled capsule containing 50 mg. of active ingredient per capsule

|  | Mg. |
|---|---|
| 2-(5-amino-1H-1,2,4-triazol-3-yl)-3,5-diamino-6-chloropyrazine | 50 |
| Lactose | 275 |
| Mixed powders | 325 |

Mix the 2-(5-amino-1H-1,2,4-triazol-3-yl)-3,5-diamino-6-chloropyrazine from Example 25 and lactose and reduce to a No. 60 mesh powder. Encapsulate, filling 325 mg. in each No. 2 capsule.

The above formulation employing more or less active ingredients or a combination of active ingredients can be employed to prepare capsules of the other novel compounds of this invention hereinbefore described. Other pharmaceutical formulations, such as tablets, pills, powders or injectables can be prepared by conventional methods to incorporate one or more of the novel products of this invention in a full or partial dosage to enable a veterinarian or physician to adjust the dosage to the needs and condition of the subject to be treated.

What is claimed is:

1. A process for the preparation of a compound of structural formulae

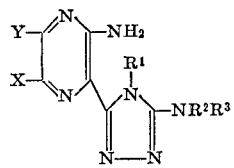

and their pharmaceutically acceptable salts wherein

R¹ is a member selected from the group consisting of
 (a) hydrogen,
 (b) lower alkyl, and
 (c) phenyl-lower alkyl;

R² is a member selected from the group consisting of
 (a) hydrogen,
 (b) lower alkenyl,
 (c) lower alkyl,
 (d) hydroxy-lower alkyl,
 (e) phenyl-lower alkyl,
 (f) amino, and
 (g) phenyl;

R³ is a member selected from the group consisting of
 (a) hydrogen,
 (b) lower alkyl, and
 (c) lower alkenyl;

X is a member selected from the group consisting of
 (a) hydrogen, and
 (b) halogen;

Y is a member selected from the group consisting of
 (a) hydrogen,
 (b) trifluoromethyl, (c) 

wherein
R⁴ is a member selected from the group consisting of
 (1) hydrogen, and
 (2) lower alkyl;
R⁵ is a member selected from the group consisting of
 (1) hydrogen,
 (2) lower alkoxy,
 (3) $C_{3-6}$-cycloalkyl,
 (4) lower alkyl,
 (5) lower alkenyl,
 (6) hydroxy-lower alkyl,
 (7) $C_{3-6}$-cycloalkyl-lower alkyl,
 (8) phenyl-lower alkyl,
 (9) halophenyl-lower alkyl,
 (10) lower alkylphenyl-lower alkyl,
 (11) furyl-lower alkyl,
 (12) pyridyl-lower alkyl,
 (13) amino-lower alkyl, and
 (14) di(lower alkyl)amino-lower alkyl;

R⁴ and R⁵ when lower alkyl and linked together form a member selected from the group consisting of
 (1) —(CH₂)₄—,
 (2) —(CH₂)₅—, and
 (3) —(CH₂)₂—N(CH₃)—(CH₂)₂— which comprises heating a compound of structural formula

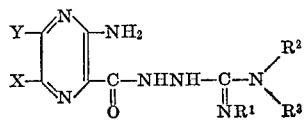

wherein R¹, R², R³, X and Y are as defined above at 50–300° C.

2. The process as claimed in claim 1, wherein the reaction is conducted in the presence of a solvent.

3. A process for the preparation of a compound of structural formula

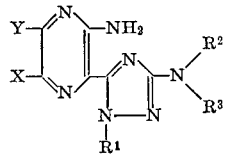

which comprises heating at 50 to 300° C. a compound of structural formula

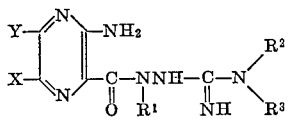

wherein R¹, R², R³, X and Y are defined in claim 1.

4. The process as claimed in claim 3, wherein the reaction is conducted in a solvent.

5. The process as claimed in claim 1, wherein X is chloro, and Y is selected from hydrogen and amino.

6. The process as claimed in claim 3, wherein X is chloro, and Y is selected from hydrogen and amino.

7. A compound of structural formula

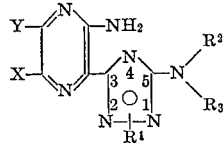

wherein R¹ is linked to N² or N⁴, and its pharmaceutically acceptable salts, wherein R¹ is a member selected from the group consisting of
 (a) hydrogen,
 (b) lower alkyl, and
 (c) phenyl-lower alkyl;

R² is a member selected from the group consisting of
 (a) hydrogen,
 (b) lower alkenyl,
 (c) lower alkyl,
 (d) hydroxy-lower alkyl,
 (e) phenyl-lower alkyl,
 (f) amino, and
 (g) phenyl;

R³ is a member selected from the group consisting of
 (a) hydrogen,
 (b) lower alkyl, and
 (c) lower alkenyl;

X is a member selected from the group consisting of
 (a) hydrogen, and
 (b) halogen;

Y is a member selected from the group consisting of
 (a) hydrogen,
 (b) trifluoromethyl,
 (c) amino, and (d) 

wherein
R⁴ is a member selected from the group consisting of
 (1) hydrogen, and
 (2) lower alkoxy,
R⁵ is a member selected from the group consisting of
 (1) hydrogen,
 (2) lower alkoxy,
 (3) C₃₋₆-cycloalkyl,
 (4) lower alkyl,
 (5) hydroxy-lower alkyl,
 (6) C₃₋₆-cycloalkyl-lower alkyl,
 (7) phenyl-lower alkyl,
 (8) halophenyl-lower alkyl,
 (9) lower alkylphenyl-lower alkyl,
 (10) furyl-lower alkyl,
 (11) pyridyl-lower alkyl,
 (12) amino-lower alkyl,
 (13) lower alkenyl, and
 (14) di(lower alkyl)amino-lower alkyl, R⁴ and R⁵ when lower alkyl and linked together form a member selected from the group consisting of
 (1) —(CH₂)₄—,
 (2) —(CH₂)₅—, and
 (3) 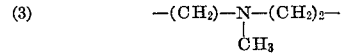

8. 2-[4-lower alkyl-5-di(lower alkyl)amino-1H-1,2,4-triazol-3-yl]-3-amino-6-chloropyrazine.

9. 2-(4-lower alkyl-5-amino-1H-1,2,4-triazol-3-yl)-3,5-diamino-6-chloropyrazine.

10. 2-(2 - lower alkyl-5-amino-1H-1,2,4-triazol-3-yl)-3,5-diamino-6-chloropyrazine.

11. 2-(5 - lower alkylamino-1H-1,2,4-triazol-3-yl)-3,5-diamino-6-chloropyrazine.

12. 2-(4-methyl - 5 - dimethylamino-1H-1,2,4-triazol-3-yl)-3-amino-6-chlorpyrazine.

13. 2-(2 - phenethyl - 5 - amino-1H-1,2,4-triazol-3-yl)-3,5-diamino-6-chlorpyrazine.

14. 2-(2 - methyl - 5 - amino-1H-1,2,4-triazol-3-yl)-3,5-diamino-6-chlorpyrazine.

15. 2-( 5 - methylamino - 1H-1,2,4-triazol-3-yl)-3,5-diamino-6-chlorpyrazine.

16. 2-(5 - amino - 1H-1,2,4-triazol-3-yl)-3,5-diamino-6-chlorpyrazine.

References Cited
UNITED STATES PATENTS 3,299,063  1/1967  Cragoe et al. _____ 260—250

NICHOLAS S. RIZZO, Primary Examiner

U.S. Cl. X.R.
424—250

UNITED STATES PATENT OFFICE
CERTIFICATE OF CORRECTION

Patent No. 3,515,723　　　　Dated June 2, 1970

Inventor(s) Edward J. Cragoe, Jr.

It is certified that error appears in the above-identified patent and that said Letters Patent are hereby corrected as shown below:

In column 4, line 10, correct the spelling of "estes" to read --esters--; line 30, under the first structure insert --VI--; line 35, change "$R_7$" to read --$R_6$--; line 45, correct the second structure to appear as follows:

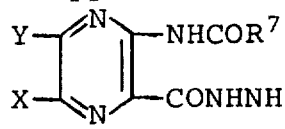

In column 5, line 11, correct the spelling of "mixtue" to read --mixture--; line 14, change "(+HCl)$_7$" to read --(+HCl)--; line 22, correct the spelling of "meethanol" to read --methanol--. In column 8, line 40, change "hydrochlorid" to read --hydrochloric--. In column 10, line 26, correct the triazol ring to appear as follows:

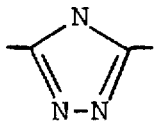

Column 10, example 38, correct "C" in the column headed X to read --Cl--. In column 14, line 15, change "alkoxy" to read --alkyl--; line 17, change the spelling of "ailkoxy" to read --alkoxy--.

SIGNED AND
SEALED
NOV 10 1970

(SEAL)
Attest:

Edward M. Fletcher, Jr.
Attesting Officer

WILLIAM E. SCHUYLER, JR.
Commissioner of Patents